United States Patent Office 3,131,171
Patented Apr. 28, 1964

3,131,171
CATALYST FOR THE POLYMERIZATION OF OLEFINS CONTAINING THE PRODUCT OF A TITANIUM HALIDE AND AN ORGANOALUMINUM COMPOUND MIXED WITH A LOWER ALKYL HALIDE SOLUTION OF ALUMINUM CHLORIDE
John D. Calfee, Dayton, Ohio, assignor to Monsanto Chemical Company, St. Louis, Mo., a corporation of Delaware
No Drawing. Filed Nov. 14, 1958, Ser. No. 773,821
11 Claims. (Cl. 260—93.5)

This invention relates to Ziegler catalysts, to the preparation of Ziegler catalysts, and to the use of Ziegler catalysts to effect chemical reactions, especially polymerizations. In certain preferred aspects, the invention pertains to the production of high-density polyethylene by polymerizing ethylene in the presence of a catalyst exemplified by the material obtained by the interaction of a trialkyl aluminum with titanium tetrachloride, (hereinafter referred to as Ziegler catalysts) in conjunction with a solution of aluminum chloride in a lower alkyl halide.

The essence of the present invention lies in the use of a solution of aluminum chloride in a lower alkyl halide, e.g., methyl chloride or ethyl chloride along with a Ziegler catalyst to polymerize ethylenically unsaturated monoolefin hydrocarbons having from 2 to 8 carbon atoms to solid high molecular weight polymers.

There has come into commercial prominence the polymerization of ethylene and other monomers through the agency of a type of catalyst advanced by Prof.-Dr. Karl Ziegler, of the Max Planck Institute, at Mulheim, Ruhr, Germany. Probably, the preferred group of these catalysts is that disclosed in Belgian Patent No. 533,362, issued May 16, 1955, to Ziegler, the disclosure of which is hereby incorporated herein by reference, namely catalysts prepared by the interaction of a trialkylaluminum with a compound of a metal of groups IV–B, V–B or VI–B of the periodic system, including thorium and uranium, and especially compounds of titanium, zirconium and chromium. These and the variety of other catalysts of the Ziegler type, can be considered exemplified by the catalyst obtained by the interaction of a trialkylaluminum with titanium tetrachloride. Other catalysts of the Ziegler type differ from those disclosed in the above-mentioned Belgian Patent No. 533,362, in various ways, for example, as follows. Instead of or in addition to the aluminum trialkyls, catalysts of the type described in the Belgian patent can be made by reacting the various metal compounds of groups IV–B, V–B and VI–B disclosed therein with aluminum compounds of the general formula RAlX$_2$, where R is hydrogen or hydrocarbon, X means any other substituent including hydrogen or hydrocarbon, particularly dialkyl or diaryl aluminum monohalides, also aluminum hydride, alkyl or aryl aluminum dihydrides, dialkyl or diaryl aluminum hydrides, alkyl or aryl aluminum dihalides, alkyl or aryl aluminum dialkoxy or diaryloxy compounds, dialkyl or diaryl aluminum alkoxy or aryloxy compounds. Another Ziegler-type catlayst is prepared by the interaction of an aluminum compound of the general formula R$_2$AlX, where R is a hydrocarbon radical such as alkyl or aryl, and X is a halogen, such as chlorine or bromine, with a compound of a metal of group VIII of the periodic system, e.g., iron, nickel, cobalt, or platinum, or manganese, for example, dimethylaluminum monobromide plus ferric chloride, diisobutylaluminum chloride plus nickel (trivalent) chloride, diethylaluminum monochloride plus manganic chloride. Yet another combination is that of the groups IV–B, V–B, or VI–B metal compounds with aluminum compounds of the general formula R$_2$AlX, where R is hydrogen or a hydrocarbon radical and X is the radical or a secondary amine, a secondary acid amide, a mercaptan, a thiophenol, a carboxylic acid, or a sulfonic acid, e.g., piperidyl diethylaluminum plus TiCl$_4$, dimethylaminodiethylaluminum plus zirconium tetrachloride, ethylmercaptodiethylaluminum plus TiCl$_4$.

Those skilled in the art having knowledge of these matters, refer to catalysts of the foregoing type as Ziegler or Ziegler-type catalysts; or as Ziegler catalysts adapted for low-pressure polymerization of ethylene or ethylenically unsaturated monomers; and to polymers prepared by their action as Ziegler or Ziegler-type polymers, the terms "Ziegler" and "Ziegler-type" being used synonymously.

Yet another disclosure incorporated herein by reference is that of Ziegler's Australian patent application 13,453/55, opened to public inspection May 10, 1956, directed to polymerizing ethylene with catalysts comprising mixtures or organic compounds of the metals of groups I to III of the periodic system of the general formula R$_n$MeX, wherein R represents a hydrocarbon radical; X, a hydrocarbon radical or halogen; and Me, a metal of groups I to III of the periodic system; and $n$, an integer which is less by one than the valency of the metal Me, with compounds of the metals of group VIII of the periodic system or manganese.

Another group of valuable Ziegler catalysts can be defined as mixtures of organic compounds of metals selected from the group consisting of R$_n$MeX in which R is hydrocarbon; Me is a 1st to 3rd group metal; X is hydrogen, hydrocarbon or halogen; and $n$ is a number which is lower by 1 than the valence of the metal Me, with a salt of a groups IV–B to VI–B metal.

The Ziegler catalyst is believed to act as a heterogeneous catalyst, i.e., at least some of the product obtained by the interaction of the materials in question is present in solid form, although often in such finely-divided form as to be of colloidal or sub-colloidal particle size. The Ziegler catalyst can be employed in the absence of any extraneous liquid suspending agent, such as a liquid inert hydrocarbon, e.g., kerosene, but is more often employed in the form of a colloidal solution or suspension in such a liquid.

The theory as to the mechanism by which polymerization proceeds according to my intention is not presently known. The Ziegler catalyst is believed to operate by a heterogeneous mechanism, monomer being polymerized at or near the surface of the finely divided catalyst particles. Solvents which dissolve the Ziegler catalyst stop the polymerization reaction. When the Ziegler catalyst is added to the aluminum chloride solution it is possible that part of the aluminum chloride is adsorbed on the Ziegler catalyst surface. The overall effect is obvious even though the mechanism is not understood, e.g., high catalyst efficiency is obtained by my discovery.

By the practice of my invention it is possible to obtain a higher yield of solid, high molecular weight polymer per gram of catalyst. This greatly increased catalyst efficiency makes possible reduced processing costs, thus a higher yield of polymer is produced in a given time and for a given reactor. Lower catalyst costs likewise result in considerable savings to the manufacturer.

Still another advantage gained by the practice of my invention is the preparation of polymer having a narrowed molecular weight distribution. The importance of this result will be discussed further herein.

While the present invention is of special interest at the present time with respect to polyethylene in which crystallinity is almost solely a reflection of the degree and type of branching, it is also applicable to all Ziegler-type polymerizations, special reference being made to the preparation of polypropylene, polybutene, poly-4-methylpentene-1 and polymers of other ethylenically unsaturated olefin hydrocarbons having up to 8 carbon atoms in the monomer molecule, which are currently of the most potential interest from a commercial viewpoint.

Ziegler catalysts can be employed to catalyze a variety of chemical reactions, for example the chlorination of benzene to produce mono- and polychlorobenzenes, especially ortho- and paradichlorobenzene. The reaction of most intense commercial interest at the present time is polymerization. The present invention is broadly applicable to all Ziegler catalysts, and their use in all chemical reactions catalyzed thereby, and insofar as polymerization is concerned, is broadly applicable to all Ziegler-type polymers, i.e., all polymers prepared by polymerizing a monomer or mixture of monomers in the presence of a Ziegler-type catalyst. A monomer which can be so polymerized can properly be called a Ziegler-polymerizable monomer. Of special interest, of course, are those Ziegler solid polymers of sufficiently high molecular weight to be useful in the plastics industry, but benefits of the invention are obtainable in preparing lower-molecular-weight Ziegler semi-solid and even liquid polymers which can be used, for example, in adhesives, as lube oils, etc. The preferred polymers have a molecular weight of at least 2,000 and preferably at least 10,000. Those Ziegler polymers to which the preparation of the present invention is applied with particular advantage generally have much higher molecular weights ranging from 20,000 to 50,000 or 100,000 and even in many cases as high as 1,000,000 to 3,000,000 or more. The molecular weights in question are those calculated in the conventional manner on the basis of the viscosity of the polymer in solution as described in the Journal für Praktische Chemie, 2nd Series, vol. 158, page 136 (1941) and the Journal of the American Chemical Society, 73, page 1901 (1951).

At the present time, ethylene is the preferred monomer for preparing Ziegler polymers. The ethylene can be monopolymerized, or can be copolymerized with varying amounts, particularly on the order of from 2 to 10 percent, of higher olefins such as propylene, or butylene, especially the former. The ethylene can also be copolymerized with butadiene and/or isoprene as disclosed in the copending application of Carroll A. Hochwalt, Ser. No. 502,008, filed April 18, 1955. Also of interest are the copolymers of butadiene and/or isoprene with styrene, disclosed in the copending application of Carroll A. Hochwalt, Ser. 501,795, filed April 18, 1955. Homopolymers of butadiene, homopolymers of isoprene and copolymers of butadiene with isoprene, as prepared by the use of Ziegler-type catalysts are also of great interest, having exceptionally low temperature properties, as disclosed in the copending application of Robert J. Slocombe, Ser. No. 502,189, filed April 18, 1955. Other ethylenically unsaturated hydrocarbons whose Ziegler polymers are of potential interest include propylene, butylenes, especially butene-1, amylenes, and the like. Substituted olefins are also of interest, such as vinylcyclohexane, styrene, vinylnaphthalene, vinyl aromatic hydrocarbons, generally, etc. Styrene when polymerized in the presence of Ziegler-type catalysts gives a high molecular-weight polymer showing a crystalline structure by X-ray diffraction exmination. Ziegler-type polyvinyl ethers, especially the homopolymers of alkyl vinyl ethers, e.g., ethyl vinyl ether, 2-ethylhexyl vinyl ether, etc., and copolymers of same with ethylene and other copolymerizable ethylenically unsaturated comonomers can also be prepared by the action of Ziegler catalysts, as disclosed in the copending application of Earl W. Gluesenkamp, Ser. No. 507,717, filed May 11, 1955. A variety of copolymer of the various monomers named above with each other and with other comonomers can be prepared by Ziegler catalysis, and the present invention in its broadest scope includes all such and, in fact, all polymers prepared through the agency of Ziegler-type catalysts on any single monomer or mixture of monomers polymerizable with such catalysts.

Despite the broad scope of the invention, it will be found more convenient in most of the present application to discuss the invention with specific reference to preferred embodiments thereof, and accordingly, Ziegler-type polyethylene will be especially referred to by way of example. Likewise, referred to especially by way of example will be catalysts prepared by the interaction of a trialkylaluminum with titanium tetrachloride, this being the preferred example of the preferred group of Ziegler catalysts which are those prepared by interaction of (a) an aluminum compound of the general formula $R_2AlX$, wherein R is an alkyl, cycloalkyl, or aryl radical and X is hydrogen, halogen, or an alkyl, cycloalkyl, or aryl radical, with (b) a metal halide selected from the group consisting of the chlorides, bromides and iodides of titanium and zirconium.

Procedures have been described for polymerizing ethylene or ethylene-bearing gases with the aid of aluminum chloride under pressure and at elevated temperatures to yield oily products. In addition, procedures have been described for the polymerization of ethylene with mixed catalysts of aluminum chloride and titanium tetrachloride to produce mixtures of solid polymer and oily constituents. Ethylene polymers having 10 to 20 carbon atoms have also been prepared from ethylene at atmospheric pressure and from the temperature range of 0° C. to 40° C. while using an aluminum chloride solution in ethyl chloride. However, by the use of my invention I can polymerize ethylene to a solid high molecular weight polymer having high density and a high degree of crystallinity. In accordance with one embodiment of my invention, an active Ziegler catalyst is prepared, usually, but not always, as a dispersion in an inert organic liquid. This catalyst is then combined with a solution of preferably anhydrous aluminum chloride in a lower alkyl halide.

The molar ratio of the components forming the catalyst mixture may be varied within wide limits, for example, a ratio of about 1 mole of titanium halide, about 2 moles of the aluminum alkyl and about 1 mole of aluminum chloride dissolved in ethyl or methyl chloride has proved advantageous. It is, however, also possible to work with amounts of the individual components of the catalyst which lie far outside this ratio. Thus, the mole ratio of titanium halide to aluminum alkyl can vary between 1:4 and 4:1. The amount of the aluminum chloride can also be increased or reduced so that the mole ratio of aluminum chloride to titanium halide can vary between 1:50 and 2:1. The lower alkyl halide is used in at least such an amount to dissolve all of the aluminum chloride. Large excesses of the alkyl halide can also act as a solvent and can be so used. Saturated aliphatic and cycloaliphatic hydrocarbons which are liquid at room temperature and also liquid aromatic or alkyl aromatic hydrocarbons can also be used in conjunction with the alkyl halide as solvent.

I prepare an active Zeigler catalyst preferably as a dispersion in an inert organic liquid, such as an aliphatic or aromatic hydrocarbon as will be discussed more in detail hereinafter. This dispersion is ordinarily a colloidal suspension of catalyst particles in the liquid.

Zeigler catalysts for whatever use desired, can be prepared in the vessel in which the catalyzed reaction is to be carried out, or can be prepared in one vessel and then transferred to the intended reaction vessel, and in either event, can either be used immediately after preparation or after a period of time elapses between the preparation of the catalyst and its subsequent use to catalyze, e.g., polymerization. If the catalyst is to be used after such a period of time, it is apt to lose activity during the storage period and/or produce polymer of an increased molecular weight as compared with that produced with fresh catalyst and these disadvantages can be minimized by storing Zeigler catalyst at temperatures below about 10° C. and preferably below −25° C. for fairly long storage periods, as disclosed and claimed in the copending application of Robert J. McManimie, Harry G. Hurst, and Edward H. Mottus, Ser. No. 586,352, filed May 22, 1956. While Zeigler catalysts are often conveniently prepared at room temperature, they can be prepared at higher temperature, and also certain advantages are obtained, including uniform catalyst activity over the course of a reaction period and more effective removal of catalyst residue if the catalyst is prepared at temperatures below about −25° C. as disclosed and claimed in the copending application of Robert J. McManimie, Harry G. Hurst and Edward H. Mottus, Ser. No. 586,352, filed May 22, 1956.

I prefer catalysts prepared by the interaction of (a) an aluminum compound of the general formula $R_2AlX$, wherein R is an alkyl, cycloalkyl or aryl radical and X is hydrogen, halogen or an alkyl, cycloalkyl or aryl radical, with (b) a metal halide selected from the group consisting of the chlorides, bromides and iodides of titanium and zirconium. The preparation of polymers will be described, by way of example, with particular reference to catalysts prepared by the interaction of trialkylaluminum, e.g., triethylaluminum, triisobutylaluminum, trioctylaluminum, with titanium tetrachloride.

Suitable aluminum compounds to be reacted with the chlorides, bromides and iodides of titanium or zirconium are those represented by the general formula $R_2AlX$, wherein R is an alkyl, cycloalkyl or aryl radical and X is hydrogen, halogen or an alkyl, cycloalkyl or aryl radical. By way of example, but not limitation, the following compounds are mentioned:

Triethylaluminum
Triisobutylaluminum
Trioctylaluminum
Didodecyloctylaluminum
Diisobutylaluminum hydride
Tridodecylaluminum
Diphenylaluminum bromide
Dipropylcyclohexylaluminum
Ditolylmethylaluminum
Tri-(β-phenylethyl)aluminum
Diethylaluminum chloride
Diisobutylaluminum chloride
Diisobutylaluminum iodide
Di-(β-cyclohexylpropyl)isobutylaluminum It is to be understood that mixtures of the foregoing types of aluminum compounds can be employed. One can use the total reaction mixtures obtained in the formation of such compounds, e.g., by treatment of metallic aluminum with alkyl halides resulting in the formation of such mixtures as $R_2AlCl$ plus $RAlCl_2$, termed alkylaluminum sesquihalides.

The aluminum compounds in question are interacted with one or more chlorides, bromides, or iodides of titanium or of zirconium, the chlorides and iodides being preferred. The titanium or zirconium in these halides should be in a valence form higher than the lowest possible valence. The tetrahalides are especially preferred, although the dihalides, trihalides, mixtures of di-, tri- and tetrahalides, etc., can be used. Preferred titanium or zirconium compounds are those that are soluble in an organic solvent (preferably a hydrocarbon such as hexane, benzene, kerosene, etc.) that is used in preparing the catalyst. Titanium or zirconium compounds other than the named halides, e.g., those called alcoholates, alkoxides or esters by various investigators such as titanium tetramethoxide (also called tetramethyl titanate), titanium triethoxide, tripropoxytitanium chloride, zirconium tetra-n-butoxide, or fluorides of titanium or zirconium, or complexes such as zirconium acetylacetonate, $K_2TiF_6$, or salts or organic acids such as the acetates, benzoates, etc., of titanium and zirconium, can be used to prepare catalysts with at least some activity and to that extent can be considered equivalents of the halides, however, such compounds are usually prepared from the halides and hence are more costly, and also are usually less active, so their use is economically sound only where in a particular situation favorable effects can be obtained such as increased solubility in an organic solvent that is used in preparing the catalyst, or polymer of increased molecular weight, or faster reaction rate. Although the exact action resulting from contacting the aluminum compound with the titanium or zirconium compound is not understood, it is believed likely that the zirconium or titanium halide is reduced in valence by the reaction of the added aluminum compound. The mole ratio of aluminum compound to titanium (or zirconium) compound, or stated another and simpler way, the mole ratio of aluminum to titanium (or zirconium) can vary over a wide range, suitable values being from 0.1:1 to 10:1 on up to 15:1 or higher. It is generally preferred to use an Al:Ti mole ratio between 0.3:1 and 5:1. The same ratios apply in the case of the zirconium compounds.

While active catalysts can be prepared by a variety of procedures, the simplest and perhaps most effective is to add the titanium or zirconium halide to the aluminum compound, or vice versa, preferably in the presence of an inert organic solvent. Such solvents can suitably be saturated aliphatic and alicyclic, and aromatic hydrocarbons, halogenated hydrocarbons, and saturated ethers. The hydrocarbon solvents are generally preferred. By way of example can be mentioned liquefied ethane, propane, isobutane, normal butane, n-hexane, the various isomeric hexanes, isooctane, cyclohexane, methylcyclopentane, dimethylcyclohexane, dodecane, the industrial solvents which are compounds of saturated and/or aromatic hydrocarbons, such as kerosenes, naphthas, etc., especially when hydrogenated to remove any olefin compounds and other impurities, and especially those ranging in boiling point up to 600° F. Also, benzene, toluene, ethylbenzene, cumene, decalin, ethylene dichloride, chlorobenzene, diethyl ether, o-dichlorobenzene, dibutyl ether, tetrahydrofuran, dioxane. In some instances, it is also advantageous to prepare the catalyst in the presence of a monomer; for example, if the catalyst is prepared in the presence of liquid ethylene, and then used to polymerize ethylene, a high yield of polyethylene results.

It may also be mentioned here that the polymerization can readily be effected in the presence of any of the classes of solvents and specific solvents just named. It is often helpful in obtaining efficient contact between monomers and catalyst and in aiding removal of heat of reaction, to employ large amounts of solvent, for example, from 5 to 30 parts by weight solvent per 1 part by weight total polymer produced. These inert solvents, which are solvents for the monomers, some of the catalyst components, and some of the polymers, but are non-solvents for many of the polymers, e.g., polyethylene, can also properly be termed inert liquid diluents, or inert organic liquids.

The amount of catalyst required is dependent on the other variables of the particular reaction, such polymerization, and although amounts as small as 0.01 weight percent based on total weight of monomers charged are sometimes permissible, it is usually desirable to use somewhat larger amounts, such as from 0.1 up to 2 to 5 percent or even considerably higher, say up to 20 percent, depending upon the monomer or monomers, the temperatures, pressures, and other reaction conditions. When polymerization is effected in the presence of a solvent, the catalyst to solvent weight ratio should be at least about 0.001:1 and much lower values such as 0.0001:1 can sometimes be used.

The polymerization can be effected over a wide range of temperatures, again the particular preferred temperatures being chosen in accordance with the monomer, pressure, particular catalyst and other reaction variables. For many monomers from room temperatures down to say −40° C. and even lower are suitable, and in many cases it is preferred that the temperature be maintained at below about 35° C. However, for other monomers, particularly ethylene, wider temperatures are useful, say from −100° C. up to 90° C. for ethylene. Temperatures ranging up to 150° C. and higher are generally satisfactory for Ziegler-type polymerization.

The pressure at which the polymerization is carried out is dependent upon the chosen monomer or monomers, as well as other variables. In most instances, the polymerization is suitably carried out at atmospheric pressure or higher. Sub-atmospheric pressures are permissible. Pressures ranging from atmospheric up to several hundred or even many thousand pounds per square inch, e.g., 50,000 p.s.i. and higher, are suitable. While high pressures are not required in order to obtain the reaction, they will have a desirable effect on reaction rate and, in some instances, on polymer quality. The choice of whether or not to use an appreciably elevated pressure will be one of economic and practical considerations taking into account the advantages that can be obtained thereby. The catalyst mixture of my invention may be prepared, for example, by adding the Ziegler catalyst to the solution of aluminum chloride in the alkyl halide and then adding ethylene to the combined catalyst mixture, or the individual Ziegler catalyst components can be added separately to the alkyl halide solution of aluminum chloride. It is however, also possible to mix the Ziegler catalyst with the aluminum chloride solution in the presence of ethylene monomer. As a further embodiment of my invention I can concomitantly feed streams of Ziegler catalyst suspension, aluminum chloride solution and gaseous ethylene monomer to the reactor. When ethylene is added to the preformed catalyst mixture, there is soon precipitated a solid polymer which after some time forms a thick paste with the solid. Heat generated during the polymerization can be conveniently controlled by diluting the olefin monomer with an inert gas or by operation at comparatively low pressures. However, polymer prepared at comparatively higher pressures, e.g., 100 to 200 atmospheres has the desirable property of higher density than usually achieved.

The catalyst is sensitive to various poisons, among which may be mentioned oxygen, carbon dioxide, carbon monoxide, acetylenic compounds such as acetylene, vinylacetylene, and the like. For this reason, suitable precautions should be taken to protect the catalyst and the reaction mixture from excessive contact with such materials. An excess of the organoaluminum compound tends to give a certain amount of protection against these poisons. The monomers and diluents or solvents need not be pure so long as they are reasonably free from poisons. However, best results are ordinarily obtained if the monomer feed contains at least 90 weight percent and preferably higher of the polymerizable monomer, exclusive of any solvent material. It is desirable to protect the catalyst during preparation, storage, and use by blanketing with an inert gas, e.g., nitrogen argon, or helium.

The monomer or mixture of monomers is contacted with the catalyst in any convenient manner, preferably by bringing the catalyst and monomer together with intimate agitation provided by suitable stirring or other means. The agitation can be continued during the polymerization, or in some instances, the polymerization mixture can be allowed to remain quiescent while the polymerization takes place. In the case of the more rapid reactions with the more active catalysts, means can be provided for refluxing monomer and solvent.

The polymer will be recovered from the total reaction mixture by a wide variety of procedures, chosen in accordance with the properties of the particular polymer, the presence or absence of solvent, and the like. It is generally quite desirable to remove as much catalyst from the polymer as possible, and this is conveniently done by contacting the total reaction mixture or the polymer after separation from solvent, etc., with methanolic hydrochloric acid, with an aliphatic alcohol such as methanol, isobutanol, secondary butanol, or by various other procedures. If the polymer is insoluble in the solvent, it can be separated therefrom by filtration, centrifuging or other suitable physical separation procedure. If the polymer is soluble in the solvent, it is advantageously precipitated by admixture of the solution with a non-solvent, such non-solvent usually being an organic liquid miscible with the solvent but in which the polymer to be recovered is not readily soluble. Of course, any solvent present can also be separated from polymer by evaporation of the solvent, care being taken to avoid subjecting the polymer to too high a temperature in such operation. If a high boiling solvent is used, it is usually desirable to finish any washing of the polymer with a low boiling material, such as one of the lower aliphatic alcohols or hexane, pentane, etc., which aids removal of the higher boiling materials and permits the maximum removal of extraneous material during the final polymer drying step. Such drying step is desirably effected in a vacuum at moderate temperatures, preferably well below 100° C.

In order to illustrate some of the various aspects and advantages of the invention, illustrative examples are given herein. Ethylene has been chosen as a representative monomer, triisobutylaluminum has been chosen as a representative reducing agent in preparing the catalyst, titanium tetrachloride has been chosen as a representative polyvalent metal compound that is reduced in preparing the catalyst, hexane has been chosen as a representative inert organic liquid for preparation of the catalyst dispersion. It will, of course, be understood that variations from the particular catalyst components, reactants, solvents, proportions, temperatures and the like can be made without departing from the invention.

*Example I*

The Ziegler catalyst was prepared by dissolving triisobutylaluminum in purified hexane and slowly adding thereto, while stirring, titanium tetrachloride in such amount that the final catalyst mixture had a mole ratio of aluminum to titanium of 2.0:1 and a concentration of Ziegler components (excluding hexane) of 25 g. per 100 ml. total hexane.

A 500 ml. flask was cooled in a Dry Ice-acetone bath, charged with 250 ml. methyl chloride, and 25 ml. of the above Ziegler catalyst was added (6.25 g.). The dilute catalyst slurry was maintained at −78° C. and saturated with ethylene, and the system was then sealed. After 4 days at −78° C. the catalyst was quenched by the addition of excess methanol and the polymer filtered off. The polyethylene was thoroughly washed with boiling isobutanol, followed by washing with hexane, and then dried. A total weight of 2.3 g. of tough, high molecular weight polyethylene was obtained.

*Example II*

A 500 ml. flask was charged with 400 ml. of methyl chloride saturated with anhydrous aluminum chloride (4 g.). To this solution, cooled to −78° C. was added 25 ml. of Ziegler catalyst slurry in hexane, as described in Example II. This represented 6.25 g. of catalyst having a mole ratio of aluminum to titanium of 2.0:1. This diluted catalyst slurry was held at −78° C. and saturated with ethylene as in Example II, the control, and the system was closed to permit the polymerization to proceed.

After one week at −78° C. the reactor was permitted to warm up to room temperature, during which time the excess ethylene and methyl chloride evaporated. The polymer and catalyst were washed with isobutanol to quench the catalyst, and the polymer was dissolved in kerosene at 190° C. and precipitated with isobutanol. The polyethylene was washed with fresh isobutanol followed by hexane and dried. The weight of tough, high molecular weight, solid polyethylene amounted to 5.0 g.

Since the weight of polymer, due to the Ziegler catalyst, was determined in Example I, I have shown that aluminum chloride not only extends the effect of the Ziegler catalyst, but that, in combination with Ziegler catalyst, it directly participates in the polymerization reaction as a catalyst to produce high molecular weight polymer.

*Example III*

Of particular advantage in the practive of my invention is the discovery that the molecular weight of the polymer produced can be varied at will by shifting the mole ratio of aluminum chloride to the titanium or zirconium compound. Thus, when the ratio of aluminum chloride to said titanium or zirconium compounds approaches 2.0 polymeric material is produced having a molecular weight in the lube oil range, and extremely high molecular weight solid polymer is produced when the ratio is about 1:1.

A 1-liter stirred autoclave was evacuated, swept with dry nitrogen, and charged with a Ziegler catalyst consisting of 3.8 ml. of triisobutylaluminum and 1.64 mol. of titanium tetrachloride suspended in dry hexane. The hexane was then removed by evaporation under reduced pressure. A solution of 2.5 g. anhydrous aluminum chloride dissolved in 250 g. methyl chloride was next charged to the autoclave. With the autoclave being maintained at 20 to 25°, ethylene was added until the pressure reached 240 p.s.i. and additional ethylene was continuously charged to maintain the pressure at 240 p.s.i. for 2 hours. The autoclave was then vented and the catalyst quenched by addition of isobutanol. Polyethylene obtained in this example consisting of the mixture of solid high molecular weight polymer along with some lower molecular weight oily polymer.

While the above examples teach representative conditions, which are effective when employing an alkyl halide solution of anhydrous aluminum chloride as a catalyst constituent, it will be realized that the conditions should be varied to some extent in accordance with the general principle taught herein in order to obtain optimum results with particular catalyst systems. The ratio of the catalyst components, the catalyst concentration, the aging of the catalyst, the temperature and pressure during polymerization etc., can be varied in order to modify polymer properties in the manner taught hereinabove.

The improved molecular weight distribution of the polymers prepared by the process of the present invention causes improved transparency of the polymers. This makes it feasible to blow the polymers into films which are suitble as transparent wrapping materials and the like.

While the invention has been described with particular reference to preferred embodiments thereof, it will be appreciated that variations from the details given herein can be effected without departing from the invention in its broadest aspects.

What I claim is:
1. A process for the polymerization of an ethylenically unsaturated mono-olefin hydrocarbon having from 2 to 8 carbon atoms in the molecule at a temperature below about 35° C. in the presence of a catalyst prepared by the interaction of titanium tetrachloride, a trialkylaluminum, and a solution of aluminum chloride in a lower alkyl chloride.

2. A process according to claim 1 wherein said mono-olefin hydrocarbon is ethylene.

3. The process for the polymerization of at least one ethylenically unsaturated mono-olefin hydrocarbon having from 2 to 8 carbon atoms in the monomer molecule at a temperature below about 35° C. in the presence of a catalyst prepared by mixing (a) the product obtained by the interaction of 1 mole titanium tetrachloride with from 0.25 mole to 4.0 moles of a trialkylaluminum, and (b) from 0.02 to 2.0 moles of aluminum chloride in a solution of a solvent selected from the group consisting of methyl chloride and ethyl chloride.

4. The process of claim 3 wherein said mono-olefin is ethylene.

5. The process of claim 3 wherein said mono-olefin is styrene.

6. The process of claim 3 wherein said mono-olefin is propylene.

7. A polymerization catalyst prepared by mixing a lower alkyl halide solution of from 0.02 to 2 moles anhydrous aluminum chloride with the product obtained by the interaction of 1.0 mole titanium tetrachloride with from 0.25 mole to 4.0 moles of an aluminum compound of the general formula $R_2AlX$, wherein R is selected from the group consisting of alkyl, cycloalkyl, and aryl radicals, and X is selected from the group consisting of hydrogen, halogen, alkyl, cycloalkyl, and aryl radicals.

8. The process of claim 3 wherein a copolymer of ethylene and propylene is prepared.

9. The process for the polymerization of at least one ethylenically unsaturated mono-olefin hydrocarbon having from 2 to 8 carbon atoms in the monomer molecule at a reaction temperature below about 35° C. which comprises contacting said mono-olefin with a catalyst prepared by mixing
(a) the product obtained by the interaction of 1 mole of a titanium chloride with from 0.25 mole to 4.0 moles of an aluminum compound selected from the group consisting of $R_3Al$, $R_2AlCl$, $RAlCl_2$, and mixtures of $R_2AlCl$ and $RAlCl_2$, where R is an alkyl radical, and
(b) from 0.02 to 2.0 moles of aluminum chloride in solution in a lower alkyl halide.

10. The process of claim 9 wherein said mono-olefin is ethylene.

11. The process of claim 9 wherein a copolymer of ethylene and propylene is prepared.

References Cited in the file of this patent

UNITED STATES PATENTS

| | | |
|---|---|---|
| 2,271,956 | Ruthruff | Feb. 3, 1942 |
| 2,720,292 | Grosse | Jan. 20, 1942 |
| 2,827,447 | Nowlin et al. | Mar. 18, 1958 |
| 2,832,759 | Nowlin et al. | Apr. 29, 1958 |
| 2,899,416 | Schreyer | Aug. 11, 1959 |
| 2,899,418 | Reynolds | Aug. 11, 1959 |

FOREIGN PATENTS

| | | |
|---|---|---|
| 781,837 | Great Britain | Aug. 28, 1957 |
| 785,314 | Great Britain | Oct. 23, 1957 |
| 790,399 | Great Britain | Feb. 5, 1958 |

OTHER REFERENCES

Ruff et al.: "Zeitschrift für Anorganische Chemie," volume 128, page 94 (February 1923).